US009537719B2

(12) United States Patent
Mahadevan et al.

(10) Patent No.: US 9,537,719 B2
(45) Date of Patent: Jan. 3, 2017

(54) METHOD AND APPARATUS FOR DEPLOYING A MINIMAL-COST CCN TOPOLOGY

(71) Applicant: Palo Alto Research Center Incorporated, Palo Alto, CA (US)

(72) Inventors: Priya Mahadevan, Sunnyvale, CA (US); Alina Quereilhac, Nice (FR)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 247 days.

(21) Appl. No.: 14/309,686

(22) Filed: Jun. 19, 2014

(65) Prior Publication Data

US 2015/0372873 A1 Dec. 24, 2015

(51) Int. Cl.
H04L 12/24 (2006.01)
H04L 12/733 (2013.01)
H04L 12/751 (2013.01)

(52) U.S. Cl.
CPC .......... H04L 41/12 (2013.01); H04L 41/145 (2013.01); H04L 41/142 (2013.01); H04L 45/02 (2013.01); H04L 45/126 (2013.01); Y04S 40/164 (2013.01)

(58) Field of Classification Search
None
See application file for complete search history.

(56) References Cited

U.S. PATENT DOCUMENTS 817,441 A 4/1906 Niesz
4,309,569 A 1/1982 Merkle
4,921,898 A 5/1990 Lenney
5,070,134 A 12/1991 Oyamada
5,110,856 A 5/1992 Oyamada
(Continued)

FOREIGN PATENT DOCUMENTS

DE 1720277 A1 6/1967
DE 19620817 A1 11/1997
(Continued)

OTHER PUBLICATIONS

Mahadevan, Priya, et al. "Orbis: rescaling degree correlations to generate annotated internet topologies." ACM SIGCOMM Computer Communication Review. vol. 37. No. 4. ACM, 2007.
(Continued)

Primary Examiner — Candal Elpenord
(74) Attorney, Agent, or Firm — Shun Yao; Park, Vaughan, Fleming & Dowler LLP

(57) ABSTRACT

A CCN-deployment system can design and deploy a content centric network (CCN) topology, either across a collection of CCN nodes or across an existing computer network. During operation, the system analyzes a computer network of N network nodes to determine a physical network topology. The system also determines a number, k, of network nodes of the physical network on which to overlay a content centric network (CCN). The system then determines an average degree of connectivity, and a degree-of-connectivity distribution, that achieves an optimal performance metric for the CCN overlay network. The system generates a network topology of k network nodes that satisfies the average degree of connectivity, and that satisfies the degree-of-connectivity distribution. The system can deploy the content centric network topology across k nodes of the underlying physical network.

24 Claims, 7 Drawing Sheets

(56) References Cited

U.S. PATENT DOCUMENTS

| | | |
|---|---|---|
| 5,506,844 A | 4/1996 | Rao |
| 5,629,370 A | 5/1997 | Freidzon |
| 5,870,605 A | 2/1999 | Bracho |
| 6,047,331 A * | 4/2000 | Medard ............... H04L 45/00 709/239 |
| 6,052,683 A | 4/2000 | Irwin |
| 6,091,724 A | 7/2000 | Chandra |
| 6,173,364 B1 | 1/2001 | Zenchelsky |
| 6,226,618 B1 | 5/2001 | Downs |
| 6,233,646 B1 | 5/2001 | Hahm |
| 6,332,158 B1 | 12/2001 | Risley |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,769,066 B1 | 7/2004 | Botros |
| 6,772,333 B1 | 8/2004 | Brendel |
| 6,862,280 B1 | 3/2005 | Bertagna |
| 6,901,452 B1 | 5/2005 | Bertagna |
| 6,917,985 B2 | 7/2005 | Madruga |
| 6,968,393 B1 | 11/2005 | Chen |
| 6,981,029 B1 | 12/2005 | Menditto |
| 7,013,389 B1 | 3/2006 | Srivastava |
| 7,031,308 B2 | 4/2006 | Garcia-Luna-Aceves |
| 7,061,877 B1 | 6/2006 | Gummalla |
| 7,206,860 B2 | 4/2007 | Murakami |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,382,787 B1 | 6/2008 | Barnes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,769,887 B1 | 8/2010 | Bhattacharyya |
| 7,779,467 B2 | 8/2010 | Choi |
| 7,801,177 B2 | 9/2010 | Luss |
| 7,816,441 B2 | 10/2010 | Elizalde |
| 7,831,733 B2 | 11/2010 | Sultan |
| 7,908,337 B2 | 3/2011 | Garcia-Luna-Aceves |
| 7,924,837 B1 | 4/2011 | Shabtay |
| 7,953,885 B1 | 5/2011 | Devireddy |
| 8,000,267 B2 | 8/2011 | Solis |
| 8,010,691 B2 | 8/2011 | Kollmansberger |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,312,064 B1 | 11/2012 | Gauvin |
| 8,386,622 B2 | 2/2013 | Jacobson |
| 8,467,297 B2 | 6/2013 | Liu |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,688,619 B1 | 4/2014 | Ezick |
| 8,699,350 B1 | 4/2014 | Kumar |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,903,756 B2 | 12/2014 | Zhao |
| 8,937,865 B1 | 1/2015 | Kumar |
| 9,071,498 B2 | 6/2015 | Beser |
| 9,112,895 B1 | 8/2015 | Lin |
| 2002/0010795 A1 | 1/2002 | Brown |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0176404 A1 | 11/2002 | Girard |
| 2002/0188605 A1 | 12/2002 | Adya |
| 2002/0199014 A1 | 12/2002 | Yang |
| 2003/0046437 A1 | 3/2003 | Eytchison |
| 2003/0048793 A1 | 3/2003 | Pochon |
| 2003/0051100 A1 | 3/2003 | Patel |
| 2003/0074472 A1 | 4/2003 | Lucco |
| 2003/0097447 A1 | 5/2003 | Johnston |
| 2003/0140257 A1 | 7/2003 | Peterka |
| 2004/0024879 A1 | 2/2004 | Dingman |
| 2004/0030602 A1 | 2/2004 | Rosenquist |
| 2004/0073715 A1 | 4/2004 | Folkes |
| 2004/0139230 A1 | 7/2004 | Kim |
| 2004/0218548 A1 * | 11/2004 | Kennedy ............... H04L 1/1685 370/254 |
| 2004/0221047 A1 | 11/2004 | Grover |
| 2004/0225627 A1 | 11/2004 | Botros |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0173831 A1 | 8/2006 | Basso |
| 2006/0193295 A1 | 8/2006 | White |
| 2006/0206445 A1 | 9/2006 | Andreoli |
| 2006/0215684 A1 | 9/2006 | Capone |
| 2006/0223504 A1 | 10/2006 | Ishak |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0189284 A1 | 8/2007 | Kecskemeti |

(56) References Cited

U.S. PATENT DOCUMENTS

| | | |
|---|---|---|
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255699 A1 | 11/2007 | Sreenivas |
| 2007/0255781 A1 | 11/2007 | Li |
| 2007/0274504 A1 | 11/2007 | Maes |
| 2007/0276907 A1 | 11/2007 | Maes |
| 2007/0294187 A1 | 12/2007 | Scherrer |
| 2008/0005056 A1 | 1/2008 | Stelzig |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0101357 A1 | 5/2008 | Iovanna |
| 2008/0107034 A1 | 5/2008 | Jetcheva |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0285209 A1 | 11/2009 | Stewart |
| 2009/0287835 A1 | 11/2009 | Jacobson |
| 2009/0288163 A1 | 11/2009 | Jacobson |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Kamath |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0088370 A1 | 4/2010 | Wu |
| 2010/0094767 A1 | 4/2010 | Miltonberger |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0268782 A1 | 10/2010 | Zombek |
| 2010/0272107 A1 | 10/2010 | Papp |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0022812 A1 | 1/2011 | vanderLinden |
| 2011/0055392 A1 | 3/2011 | Shen |
| 2011/0055921 A1 | 3/2011 | Narayanaswamy |
| 2011/0090908 A1 | 4/2011 | Jacobson |
| 2011/0106755 A1 | 5/2011 | Hao |
| 2011/0145597 A1 | 6/2011 | Yamaguchi |
| 2011/0145858 A1 | 6/2011 | Philpott |
| 2011/0153840 A1 | 6/2011 | Narayana |
| 2011/0161408 A1 | 6/2011 | Kim |
| 2011/0202609 A1 | 8/2011 | Chaturvedi |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0036180 A1 | 2/2012 | Thornton |
| 2012/0047361 A1 | 2/2012 | Erdmann |
| 2012/0066727 A1 | 3/2012 | Nozoe |
| 2012/0106339 A1 | 5/2012 | Mishra |
| 2012/0114313 A1 | 5/2012 | Phillips |
| 2012/0120803 A1 | 5/2012 | Farkas |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0300669 A1* | 11/2012 | Zahavi ............ H04L 45/124 370/254 |
| 2012/0314580 A1 | 12/2012 | Hong |
| 2012/0317307 A1 | 12/2012 | Ravindran |
| 2012/0331112 A1 | 12/2012 | Chatani |

(56) References Cited

U.S. PATENT DOCUMENTS

| | | |
|---|---|---|
| 2013/0041982 A1 | 2/2013 | Shi |
| 2013/0051392 A1 | 2/2013 | Filsfils |
| 2013/0060962 A1 | 3/2013 | Wang |
| 2013/0073552 A1 | 3/2013 | Rangwala |
| 2013/0073882 A1* | 3/2013 | Inbaraj ............. G06F 1/3206 713/320 |
| 2013/0074155 A1 | 3/2013 | Huh |
| 2013/0091539 A1 | 4/2013 | Khurana |
| 2013/0110987 A1 | 5/2013 | Kim |
| 2013/0111063 A1 | 5/2013 | Lee |
| 2013/0151584 A1 | 6/2013 | Westphal |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0185406 A1 | 7/2013 | Choi |
| 2013/0197698 A1 | 8/2013 | Shah |
| 2013/0198119 A1 | 8/2013 | Eberhardt, III |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227166 A1 | 8/2013 | Ravindran |
| 2013/0242996 A1 | 9/2013 | Varvello |
| 2013/0250809 A1 | 9/2013 | Hui |
| 2013/0262698 A1* | 10/2013 | Schwan ............. H04L 45/54 709/242 |
| 2013/0282854 A1 | 10/2013 | Jang |
| 2013/0282860 A1 | 10/2013 | Zhang |
| 2013/0282920 A1 | 10/2013 | Zhang |
| 2013/0304937 A1 | 11/2013 | Lee |
| 2013/0329696 A1 | 12/2013 | Xu |
| 2013/0336323 A1 | 12/2013 | Srinivasan |
| 2013/0343408 A1 | 12/2013 | Cook |
| 2014/0003232 A1 | 1/2014 | Guichard |
| 2014/0006565 A1 | 1/2014 | Muscariello |
| 2014/0029445 A1 | 1/2014 | Hui |
| 2014/0032714 A1 | 1/2014 | Liu |
| 2014/0040505 A1 | 2/2014 | Barton |
| 2014/0043987 A1* | 2/2014 | Watve ............. H04L 45/70 370/252 |
| 2014/0074730 A1 | 3/2014 | Arensmeier |
| 2014/0075567 A1 | 3/2014 | Raleigh |
| 2014/0082135 A1 | 3/2014 | Jung |
| 2014/0089454 A1 | 3/2014 | Jeon |
| 2014/0096249 A1 | 4/2014 | Dupont |
| 2014/0098685 A1* | 4/2014 | Shattil ............. H04L 67/327 370/252 |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | dekozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0192677 A1* | 7/2014 | Chew ............. H04L 69/14 370/254 |
| 2014/0192717 A1 | 7/2014 | Liu |
| 2014/0195328 A1 | 7/2014 | Ferens |
| 2014/0195666 A1 | 7/2014 | Dumitriu |
| 2014/0233575 A1 | 8/2014 | Xie |
| 2014/0237085 A1 | 8/2014 | Park |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0314093 A1 | 10/2014 | You |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0063802 A1 | 3/2015 | Bahadur |
| 2015/0095481 A1 | 4/2015 | Ohnishi |
| 2015/0095514 A1 | 4/2015 | Yu |
| 2015/0188770 A1 | 7/2015 | Naiksatam |

FOREIGN PATENT DOCUMENTS

| | | |
|---|---|---|
| EP | 0295727 A2 | 12/1988 |
| EP | 0757065 A2 | 7/1996 |
| EP | 1077422 A2 | 2/2001 |
| EP | 1384729 A1 | 1/2004 |
| EP | 2124415 A2 | 11/2009 |
| EP | 2214357 A1 | 8/2010 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |

OTHER PUBLICATIONS

Mahadevan, Priya, et al. "Systematic topology analysis and generation using degree correlations." ACM SIGCOMM Computer Communication Review. vol. 36. No. 4. ACM, 2006.

Wetherall, David, "Active Network vision and reality: Lessons form a capsule-based system", ACM Symposium on Operating Systems Principles, Dec. 1, 1999. pp. 64-79.

Kulkarni A.B. et al., "Implementation of a prototype active network", IEEE, Open Architectures and Network Programming, Apr. 3, 1998, pp. 130-142.

Nadeem Javaid, "Analysis and design of quality link metrics for routing protocols in Wireless Networks", PhD Thesis Defense, Dec. 15, 2010, Universete Paris-Est.

Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).

B. Lynn. The Pairing-Based Cryptography Library, http://crypto.stanford.edu/pbc/.

C. Gentry and A. Silverberg. Hierarchical ID-Based Cryptography. Advances in Cryptology—Asiacrypt 2002. Springer Berlin Heidelberg (2002).

D. Boner, C. Gentry, and B. Waters, 'Collusion resistant broadcast encryption with short ciphertexts and private keys,' in Proc. Crypto 2005, Santa Barbara, CA, USA, Aug. 2005, pp. 1-19.

D. Boneh and M. Franklin. Identity-Based Encryption from the Weil Pairing. Advances in Cryptology—Crypto 2001, vol. 2139, Springer Berlin Heidelberg (2001).

G. Ateniese, K. Fu, M. Green, and S. Hohenberger. Improved Proxy Reencryption Schemes with Applications to Secure Distributed Storage. In the 12th Annual Network and Distributed System Security Symposium (2005).

H. Xiong, X. Zhang, W. Zhu, and D. Yao. CloudSeal: End-to-End Content Protection in Cloud-based Storage and Delivery Services. Security and Privacy in Communication Networks. Springer Berlin Heidelberg (2012).

J. Bethencourt, A, Sahai, and B. Waters, 'Ciphertext-policy attribute-based encryption,' in Proc. IEEE Security & Privacy 2007, Berkeley, CA, USA, May 2007, pp. 321-334.

J. Lotspiech, S. Nusser, and F. Pestoni. Anonymous Trust: Digital Rights Management using Broadcast Encryption. Proceedings of the IEEE 92.6 (2004).

J. Shao and Z. Cao. CCA-Secure Proxy Re-Encryption without Pairings. Public Key Cryptography. Springer Lecture Notes in Computer ScienceVolume 5443 (2009).

M. Blaze, G. Bleumer, and M. Strauss, 'Divertible protocols and atomic prosy cryptography,' in Proc. Eurocrypt 1998, Espoo, Finland, May-Jun. 1998, pp. 127-144.

(56) References Cited

OTHER PUBLICATIONS

R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
RTMP (2009). Available online at http://wwwimages.adobe.com/www.adobe.com/content/dam/Adobe/en/devnet/rtmp/pdf/rtmp specification 1.0.pdf.
S. Chow, J. Weng, Y. Yang, and R. Deng. Efficient Unidirectional Proxy Re-Encryption. Progress in Cryptology—Africacrypt 2010. Springer Berlin Heidelberg (2010).
S. Kamara and K. Lauter. Cryptographic Cloud Storage. Financial Cryptography and Data Security. Springer Berlin Heidelberg (2010).
Sandvine, Global Internet Phenomena Report—Spring 2012. Located online at http://www.sandvine.com/downloads/documents/Phenomenal H 2012/Sandvine Global Internet Phenomena Report 1H 2012.pdf.
The Despotify Project (2012). Available online at http://despotify.sourceforge.net/.
V. K. Adhikari, S. Jain, Y. Chen, and Z.-L. Zhang. Vivisecting Youtube:An Active Measurement Study. In Infocom12 Mini-conference (2012).
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE Infocom 2012 (2012).
Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
B. Ahlgren et al., 'A Survey of Information-centric Networking' IEEE Commun. Magazine, Jul. 2012, pp. 26-36.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (Infocom Wkshps), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' Infocom 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.

(56) References Cited

OTHER PUBLICATIONS

Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012}.
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hogue et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Hur, "Improving security and efficiency in attribute-based data sharing," IEEE Trans. Knowledge Data Eng., vol. 25, No. 10, pp. 2271-2282, Oct. 2013.
V. Jacobson et al., 'Networking Named Content,' Proc. IEEE CoNEXT '09, Dec. 2009.
Jacobson, Van et al., "Content-Centric Networking, Whitepaper Describing Future Assurable Global Networks", Palo Alto Research Center, Inc., Jan. 30, 2007, pp. 1-9.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
Koponen, Teemu et al., "A Data-Oriented (and Beyond) Network Architecture", SIGCOMM '07, Aug. 27-31, 2007, Kyoto, Japan, XP-002579021, p. 181-192.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Matocha, Jeff, and Tracy Camp. 'A taxonomy of distributed termination detection algorithms.' Journal of Systems and Software 43.3 (1998): 207-221.
Matted Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE-A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE Infocom 2010, San Diego, CA, USA, Mar. 2010, pp. 1-9.

(56) References Cited

OTHER PUBLICATIONS

S.J. Lee, M. Gerla, and C. Chiang, "On-demand Multicast Routing Protocol in Multihop Wireless Mobile Networks," Mobile Networks and Applications, vol. 7, No. 6, 2002.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014}: 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network$.
D. Trossen and G. Parisis, "Designing and realizing and information-centric internet", IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
Kaya et al., "A Low Power Lookup Technique for Multi-Hashing Network Applications", 2006 IEEE Computer Society Annual Symposium on Emerging VLSI Technologies and Architectures, Mar. 2006.

\* cited by examiner

METHOD AND APPARATUS FOR DEPLOYING A MINIMAL-COST CCN TOPOLOGY

BACKGROUND

Field

This disclosure is generally related to computer networks. More specifically, this disclosure is related to deploying an overlay content centric network across an Internet Protocol network.

Related Art

Recent research efforts are producing content centric networking (CCN) to re-architect the entire network stack around content. In CCN, packets typically do not contain network addresses for a source and a destination of the packet. Rather, clients issue requests for Content Objects, and routers across the network route these requests directly through the network to a closest network node that stores a copy of the content, which returns a packet that includes the requested Content Object to respond to the request.

CCN can use controlled flooding as a mechanism to route the requests to the appropriate content providers, which eliminates the burden of having to configure explicit routes to all possible content providers. However, the benefits produced by this mechanism comes at the cost of an increased overhead of the object-requesting traffic in the network. To make matters worse, the way CCN nodes are connected to each other has a major impact in the amount of Interests present in the network, which makes it difficult to deploy a CCN network without a debilitating overhead. For example, a sub-optimal CCN topology may cause Interests to flow via an undesirably large number of links, and can produce network congestion at certain CCN nodes. This sub-optimal topology can result in unnecessary processing overhead at the CCN nodes, and can increase the delivery time for content accessed by these Interests.

SUMMARY

One embodiment provides a system that designs and deploys a content centric network (CCN) topology, either across a collection of CCN nodes or across an existing Internet Protocol (IP) network as an overlay. During operation, the system analyzes a computer network of N network nodes to determine a physical network topology. The system also determines a number, k, of network nodes of the physical network on which to overlay a content centric network (CCN). The system then determines topology specific properties such as average degree of connectivity, and a degree-of-connectivity distribution, that achieves an optimal performance metric for the CCN overlay network. The system generates a network topology of k network nodes that satisfies the average degree of connectivity, and that satisfies the degree-of-connectivity distribution (or any other alternative or additional requirement). The system can deploy the content centric network topology across k nodes of the underlying physical network.

In some embodiments, the overlay CCN network can forward Interest messages based on a name for a piece of data, using the IP-based physical network. In CCN, each piece of content is individually named, and each piece of data is bound to a unique name that distinguishes the data from any other piece of data, such as other versions of the same data or data from other sources. This unique name allows a network device to request the data by disseminating a request or an Interest that indicates the unique name, and can obtain the data independent from the data's storage location, network location, application, and means of transportation. The following terms describe elements of a CCN architecture:

Content Object: A single piece of named data, which is bound to a unique name. Content Objects are "persistent," which means that the unique name and data are bound via a cryptographic signature. A Content Object can move around within a computing device, or across different computing devices, but does not change. If any component of the Content Object changes, the entity that made the change creates a new Content Object that includes the updated content, and binds the new Content Object to a new unique name via a new cryptographic signature.

Unique Names: A name in a CCN is typically location independent and uniquely identifies a Content Object. A data-forwarding device can use the name or name prefix to forward a packet toward a network node that generates or stores the Content Object, without requiring a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ndn, and test.txt can be structured in a left-oriented prefix-major fashion to form the name "/parc/home/ndn/test.txt." Thus, the name "/parc/home/ndn" can be a "parent" or "prefix" of "/parc/home/ndn/test.txt." Additional components can be used to distinguish between different versions of the content item, such as a collaborative document.

In some embodiments, the name can include a non-hierarchical identifier, such as a hash value that is derived from the Content Object's data (e.g., a checksum value) and/or from elements of the Content Object's name. A description of a hash-based name is described in U.S. patent application Ser. No. 13/847,814 (entitled "ORDERED-ELEMENT NAMING FOR NAME-BASED PACKET FORWARDING," by inventor Ignacio Solis, filed 20 Mar. 2013), which is hereby incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest: A packet that indicates a request for a piece of data, and includes a name (or a name prefix) for the piece of data. A data consumer can disseminate a request or Interest across an Content-Centric Network, which CCN routers can propagate toward a storage device (e.g., a cache server) or a data producer that can provide the requested data to satisfy the request or Interest.

In some embodiments, the methods disclosed herein are also applicable to other information centric networking (ICN) architectures, such as a named data network (NDN). A description of a CCN architecture is described in U.S. patent application Ser. No. 12/338,175 (entitled "CONTROLLING THE SPREAD OF INTERESTS AND CONTENT IN A CONTENT CENTRIC NETWORK," by inventors Van L. Jacobson and Diana K. Smetters, filed 18 Dec. 2008), which is hereby incorporated by reference.

In some embodiments, the performance metrics include at least one of: Interest overhead; a number of Interest retransmissions; available network bandwidth; a network utilization; and an Interest-to-Content-Object round-trip delay.

In some embodiments, while determining the average degree of connectivity, the system iterates over one or more values for average degrees of connectivity to generate a network topology of k network nodes for each average degree of connectivity. The system computes a performance metric for each network topology, and selects an average degree of connectivity with a highest performance metric.

In some embodiments, while determining the degree-of-connectivity distribution, the system determines an optimal distribution based on a power-law distribution, based on a Gaussian distribution, or parameters associated with the distribution. The system can also determine an optimal distribution based on any other probability distribution now known or later developed, and/or with parameters associated with the distribution.

In some embodiments, while determining the degree-of-connectivity distribution, the system iterates over one or more distribution functions to generate a network topology of k network nodes that satisfies the average degree of connectivity based on a corresponding distribution function. The system then computes a performance metric for each network topology, and selects a degree-of-connectivity distribution with a highest performance metric.

In some embodiments, while determining the degree-of-connectivity distribution, the system iterates over one or more parameters for the distribution function to generate a network topology of k network nodes that satisfies the average degree of connectivity based on each distribution function. The system then computes a performance metric for each network topology, and selects network parameters with a highest performance metric.

In some embodiments, while determining the degree-of-connectivity distribution, the system determines an optimal degree-distribution matrix that specifies an occurrence value for each pair of degrees of connectivity. The degree-distribution matrix achieves an optimal performance metric for a network topology of k network nodes that satisfies the average degree of connectivity.

BRIEF DESCRIPTION OF THE FIGURES

In the figures, like reference numerals refer to the same figure elements.

DETAILED DESCRIPTION

Figure 1:
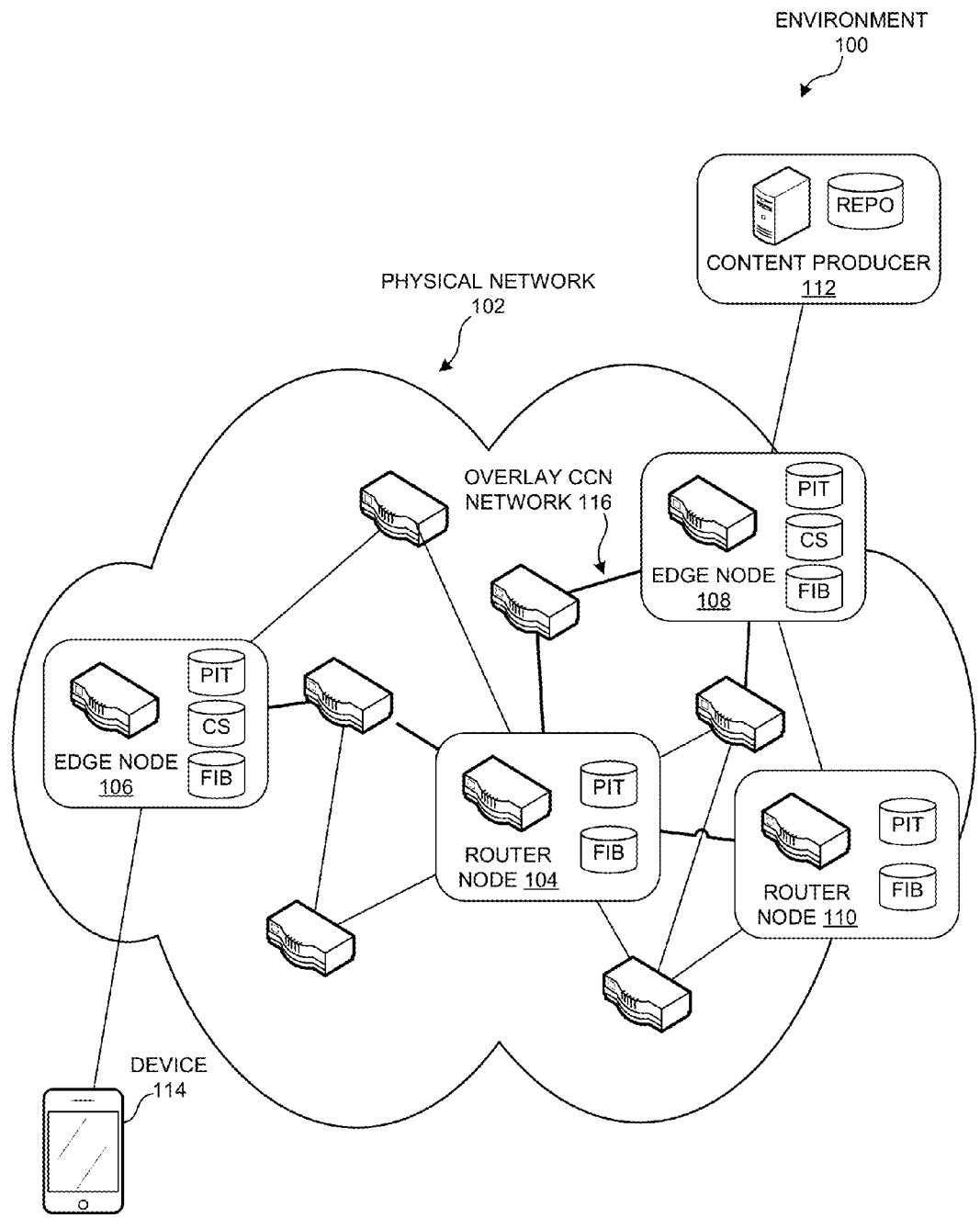
FIG. 1 illustrates an exemplary content centric network overlaid across an IP network in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

OVERVIEW

Embodiments of the present invention provide a CCN-deployment system that solves the problem of determining an optimal network topology for a content centric network (CCN), such as when deploying the CCN network on a network where every node has CCN capabilities, or when deploying a CCN overlay on top of the Internet or any physical network. For example, a physical network can include a set of routers, servers, and client devices, each of which is tied to an IP address. Specifically, each IP address corresponds to a specific network node of the physical IP network, and nodes in the physical network can forward a data packet to an intended recipient based on its IP address. However, in a CCN network, an Interest message specifies a name for a piece of data being requested, and nodes across the CCN network can forward the Interest message to reach any device that can provide the data.

In some embodiments, the CCN-deployment system can determine a network topology for the CCN network, and deploys the CCN network across the physical IP network as an overlay network, using a subset of the nodes in the IP network. While deploying the CCN network, the CCN-deployment system may create the appropriate faces (e.g., physical or virtual interfaces) or virtual links across the physical IP network that implement the CCN topology. Also, the CCN network's topology can influence the performance of the overlay CCN network. Hence, the system can test various topology parameters using one or more performance metrics to determine which topologies achieve near-optimal performance metrics. The connectivity properties of the CCN topology can have a major impact in the amount of Interests present in the network. For instance, a sub-optimal CCN topology may cause Interests to flow via an undesirably large number of links, and can produce network congestion at certain CCN nodes.

The system can use graph characterization as well as connectivity information among the CCN nodes to create the overlay CCN network, and to predict performance metrics for the overlay network. These performance metrics can include typical network performance metrics, as well as CCN-specific performance metrics such as a number (or percentage) of CCN Interests messages that are transmitted or retransmitted, an overhead due to these Interests messages, an expected time to retrieve the Content Object, etc.

The system can use these predicted metrics as well as measurements gathered from the live network to fine-tune the overlay network's topology, such as by creating new CCN faces (or links) or tearing down existing CCN faces to achieve an optimal CCN network topology. For example, if a network provider wants to deploy CCN on k nodes of a physical network, the system can compute the best CCN overlay topology design (e.g., a mesh topology, a tree topology etc.) based on the connectivity properties of each overlay network to predict the performance metrics. The operator or the CCN-deployment system can adjust the overlay CCN network by dynamically adding or removing CCN edges based on the CCN topology produced by the system.

FIG. 1 illustrates an exemplary content centric network 102 overlaid across a physical network 100 in accordance with an embodiment. Computing environment 100 can include a physical network 102, which can include any wired or wireless network that interfaces various computing devices to each other, such as a computer network implemented via one or more technologies (e.g., Bluetooth, Wi-Fi, cellular, Ethernet, fiber-optic, etc.).

In some embodiments, physical network 100 may include a pre-existing computer network, such as an IP-based network. The CCN-deployment system can select a subset of physical network 100 to use for deploying an overlay CCN network 116 (illustrated using bold lines in physical network 102). For example, the system can determine that a four-node overlay CCN network can have a near-optimal performance when the overlay CCN network has a certain topology (e.g., a tree topology, or a topology with a certain average degree or a certain degree distribution). Hence, the system can deploy overlay CCN network 116 by configuring edge node 106 and edge node 108 to also function as CCN nodes. Edge nodes 106 and 108 can include a forwarding information base (FIB) for processing and forwarding Interests, a pending interest table (PIT) for processing and forwarding Content Objects, and a Content Store (CS) for caching Content Objects. The system can also configure router nodes 104 and 106 to operate as CCN nodes due to their high degree of connectivity. Specifically, the system can configure router node 104 to operate as a hub of overlay CCN network 116 due to its connectivity to the other nodes of CCN network 116.

In some embodiments, the system can maintain overlay CCN network 116 to ensure that it maintains a desired topology. For example, if a link or a CCN face fails, or if a CCN node goes offline or becomes unreachable (e.g., router node 104 or 110), the system can select other nodes in the physical network to use to preserve the same topology, or can deploy an alternative CCN network topology that achieves near-optimal performance metrics.

Designing a CCN Topology

The CCN-deployment system characterizes network topology properties that contribute to the increase in the Interests overhead, and that impact the time to deliver content, and use this property characterization information to design optimal CCN overlays. For example, the system can first isolate the topological properties that impact CCN Interest overhead and the time to deliver content. To achieve this, the system analyzes graph properties in a dK-series of graphs to determine how they are interconnected. These graphs include n nodes, where degrees $k_1, k_2, \ldots k_p$ are the unique degrees in the graph. The number of unique degrees p does not need to be equal to the size of the graph n, as multiple nodes may have the same degree.

The system can generate a set of dK-graphs that reproduce a correlation between each dK property and the degrees of connectivity in all d-sized sub-graphs of an underlying graph (e.g., an underlying N-node physical network topology). When d=0, 0K-graphs reproduce the average degree of connectivity of the underlying graph. For d=1, 1K-graphs reproduce the degree-of-connectivity distribution of the underlying graph. When d=2, 2K-graphs reproduce the joint degree distribution of the given graph. Extending this series in a similar fashion, when d=n, the generated nK-graphs are isomorphic to the underlying graph. In summary, each property in the dK-series embeds increasingly more information about the underlying graph's structure, and thus the corresponding dK-graphs are increasingly constrained, until the dK-graphs converge to the underlying graph.

The system can generate the dK-graphs by generating random graph structures that satisfy the dK-distribution, and measures the expected CCN performance metrics (e.g., the Interest overhead and time to deliver content) for each chosen distribution. These dK-graphs can reveal the distribution of topological properties for various graph topologies, such as the average node degree or the probability of finding k+1 nodes interconnected in a given structure (e.g., a tree structure, a mesh structure, etc.). For example, 2K-graphs can reveal the probability that a node of degree m connects to another node with degree p. Further, 3K-graphs can capture the probability distribution of loops up to 3 nodes. Once the dK distribution is revealed, the dK-graph constructing algorithm can be used to construct random graphs that represent this distribution.

In some embodiments, the system can characterize 2K-graphs by their assortativity coefficient, which summarizes the 2K-graph configuration distribution in one single value. The system can map performance metric values (e.g., an expected CCN traffic overhead and a time to deliver content) to the corresponding assortativity coefficient that describes the topological properties of a specific 2K family of graphs.

The system can also generate a plot graph that illustrates this mapping, with the performance metrics on the x-axis and the assortativity coefficients on the y-axis, to allow network administrators to easily choose an assortativity coefficient that best suits the needs of their CCN infrastructure. The plot graph can include a plot for each different performance metric being used to analyze the dK-graphs, which illustrates the correlation between the assortativity coefficients (and the various corresponding graph structures) to the various different performance metrics.

In some embodiments, the system can automatically (e.g., without human intervention) compute a near-optimal assortativity coefficient value by searching for and identifying an assortativity coefficient that optimizes one or more predetermined performance metrics (e.g., by minimizing both the average path length and the average Interests count).

The system can also analyze higher-order dK-graphs. For example, the system can analyze 3K-graph probability distributions to compute a clustering coefficient. These 3K graphs can yield more information about the graph topological constraints, but doing so requires a significantly higher computational overhead. As a work around to this problem, the system can generate smaller 3K-graphs to analyze their graph topological constraints, and compare their clustering coefficients. Then, after selecting a graph structure that satisfies the topological constraints, the system can use a graph scaling algorithm to generate a scaled the graph of the desired size, and which preserves the desired graph structure's clustering coefficient.

Once the system identifies the assortativity coefficient and/or the clustering coefficient that satisfies CCN network requirements, the system can generate the necessary CCN topology that satisfies these coefficients using the dK-graph constructing algorithm. The administrator can also use the CCN-deployment system to further refine the CCN topology using real-world performance data obtained after having deployed the CCN topology across a computer network (e.g., the Internet, or any physical network). For example, if the deployed CCN topology experiences congestion conditions, or when down links are detected in a running CCN environment, the system can revise the CCN topology to produce a new graph configuration that preserves the desired dK distribution.

Figure 2:
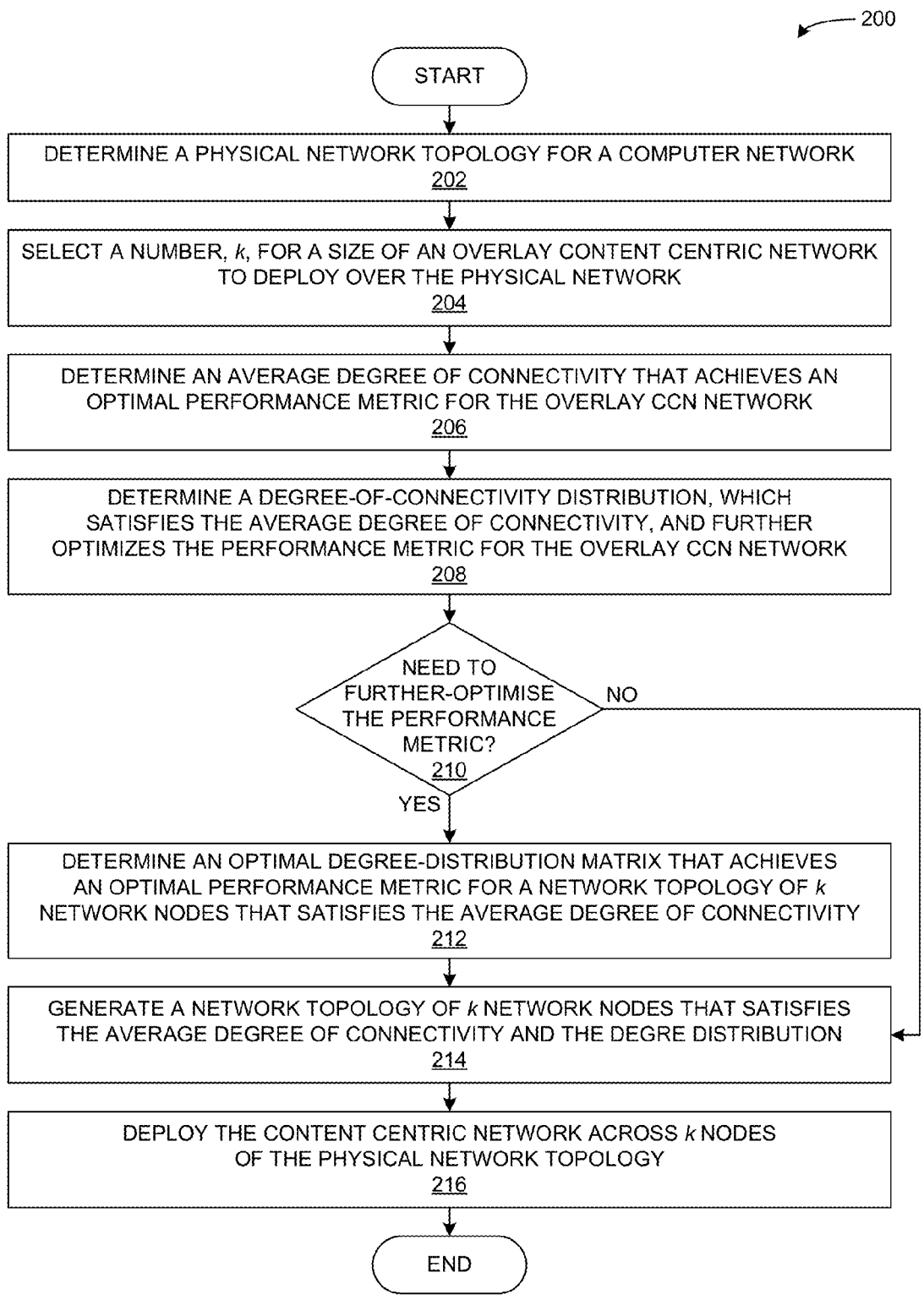
FIG. 2 presents a flow chart illustrating a method for deploying an overlay content centric network across an IP network in accordance with an embodiment.

FIG. 2 presents a flow chart illustrating a method 200 for deploying an overlay content centric network across an IP network in accordance with an embodiment. During operation, the system can determine a physical network topology for a computer network of N network nodes (operation 202).

The system then selects a number, k, for a size of an overlay content centric network to deploy over the physical network (operation 204). The system also determines characteristics of the overlay content centric network that can optimize one or more performance metrics. For example, the system can construct and analyze various overlay network topologies to determine an average degree of connectivity that achieves an optimal performance metric for the overlay CCN network (operation 206). The system can also fine-tune the requirements for the overlay network topology by constructing and analyzing various overlay network topologies to determine a degree-of-connectivity distribution that satisfies the average degree of connectivity, and that further optimizes the performance metric for the overlay CCN network (operation 208).

In some embodiments, the system can determine whether to further optimize the performance metrics (operation 210). If the system does not need to further optimize the performance metrics, the system can proceed to generate a network topology of k nodes that satisfies the average degree of connectivity and the degree-of-connectivity distribution (operation 214).

On the other hand, if the system needs to further optimize the performance metrics, the system can determine an optimal degree-distribution matrix that further optimizes the performance metrics for a network topology that satisfies the average degree of connectivity (operation 212). The system then generates a network topology of k nodes that satisfies the average degree of connectivity and the degree-distribution matrix (operation 214).

Once the system has generated an optimized network topology, the system can deploy the overlay CCN network across k nodes of the physical network topology (operation 216).

Figure 3A:
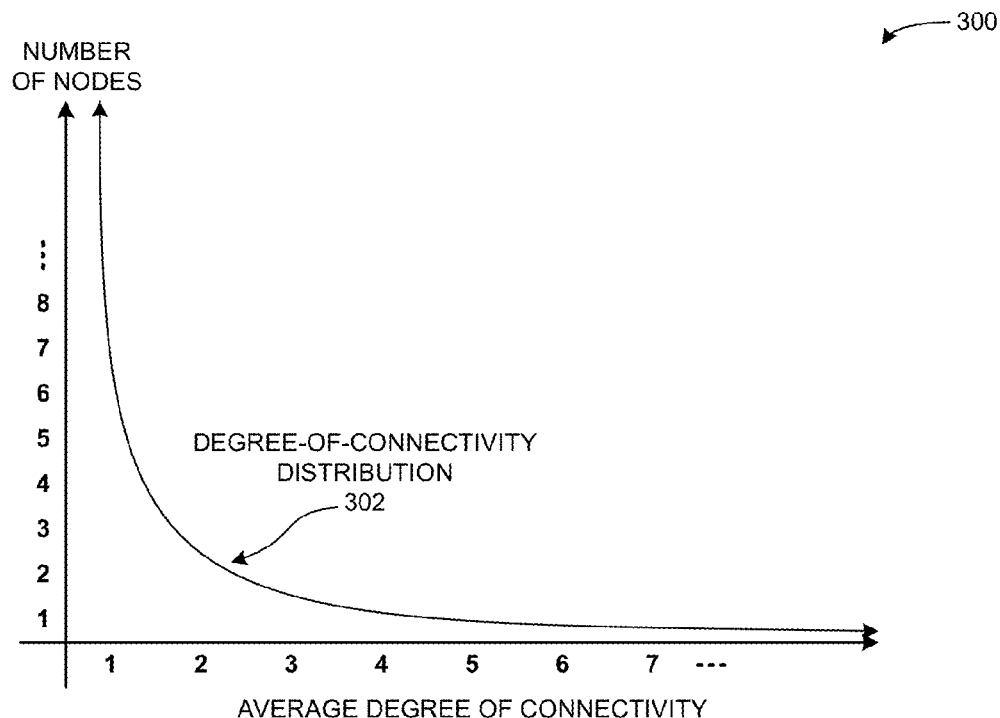
FIG. 3A illustrates an exemplary degree-of-connectivity distribution in accordance with an embodiment.

FIG. 3A illustrates an exemplary degree-of-connectivity distribution 300 in accordance with an embodiment. Specifically, the x-axis for distribution 300 spans a range of average degrees of connectivity, and the y-axis specifies a number of nodes that have a given degree of connectivity.

In some embodiments, the system generates degree-of-connectivity distribution 300 to satisfy a predetermined average degree of connectivity. For example, if the system has determined that an average degree of connectivity of 1.96 can result in near-optimal performance metrics, the system can generate various alternative degree-of-connectivity distributions that satisfy the 1.96 average degree of connectivity. The system can use a power-law distribution function, a Gaussian distribution function, or any other distribution function now known or later developed. While generating distribution 300, the system can fine tune the distribution function's parameters to ensure the distribution satisfies the predetermined average degree of connectivity. The system can test these various distribution functions by generating and simulating various network topologies that satisfy these distributions, and selects a distribution that further improves the quality metrics.

Figure 3B:
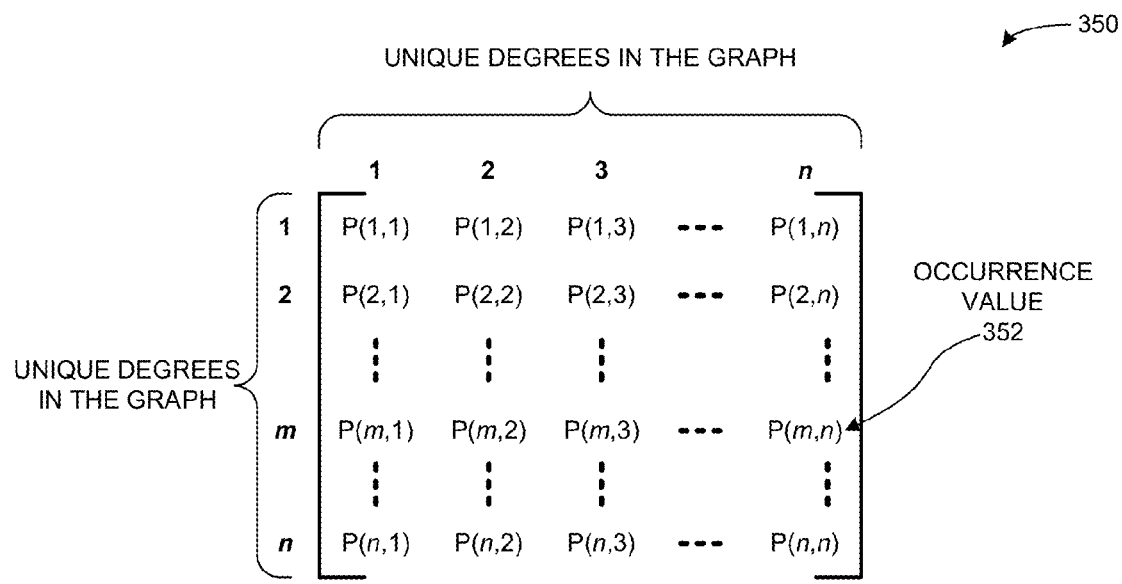
FIG. 3B illustrates an exemplary degree-distribution matrix in accordance with an embodiment.

FIG. 3B illustrates an exemplary degree-distribution matrix 350 in accordance with an embodiment. Specifically, the rows and columns of degree-distribution matrix 350 span various degrees of connectivity for two neighboring network nodes. Also, distribution matrix 350 can include a square matrix, and each element of distribution matrix 350 corresponds to a unique degree combination. Each cell (i,j) of distribution matrix 350 shows the probability of a node with degree i connecting to a node of degree j. For example, occurrence value 352 can correspond to a probability that two neighboring nodes in the CCN topology have the given degree of value m and value n, where the node of degree value m has an active interface to the node of degree value n. Alternatively, occurrence value 352 can include a total number of connections (or a fraction of all possible connections) that are between two neighboring nodes in the CCN topology have the given degree of value m and value n.

Also, the system can generate degree-distribution matrix 350 to satisfy a predetermined average degree of connectivity. In some embodiments, the system can generate matrix 350 by first entering values based on a predetermined distribution function, and then adjusting the occurrence values at various cells to further improve the quality metrics while preserving the predetermined average degree of distribution. In some other embodiments, the system can generate matrix 350 by first entering randomly generated occurrence values for each cell across matrix 350. The system then adjusts the occurrence values at various cells to further improve the quality metrics, and to preserve the predetermined average degree of distribution.

Figure 4:
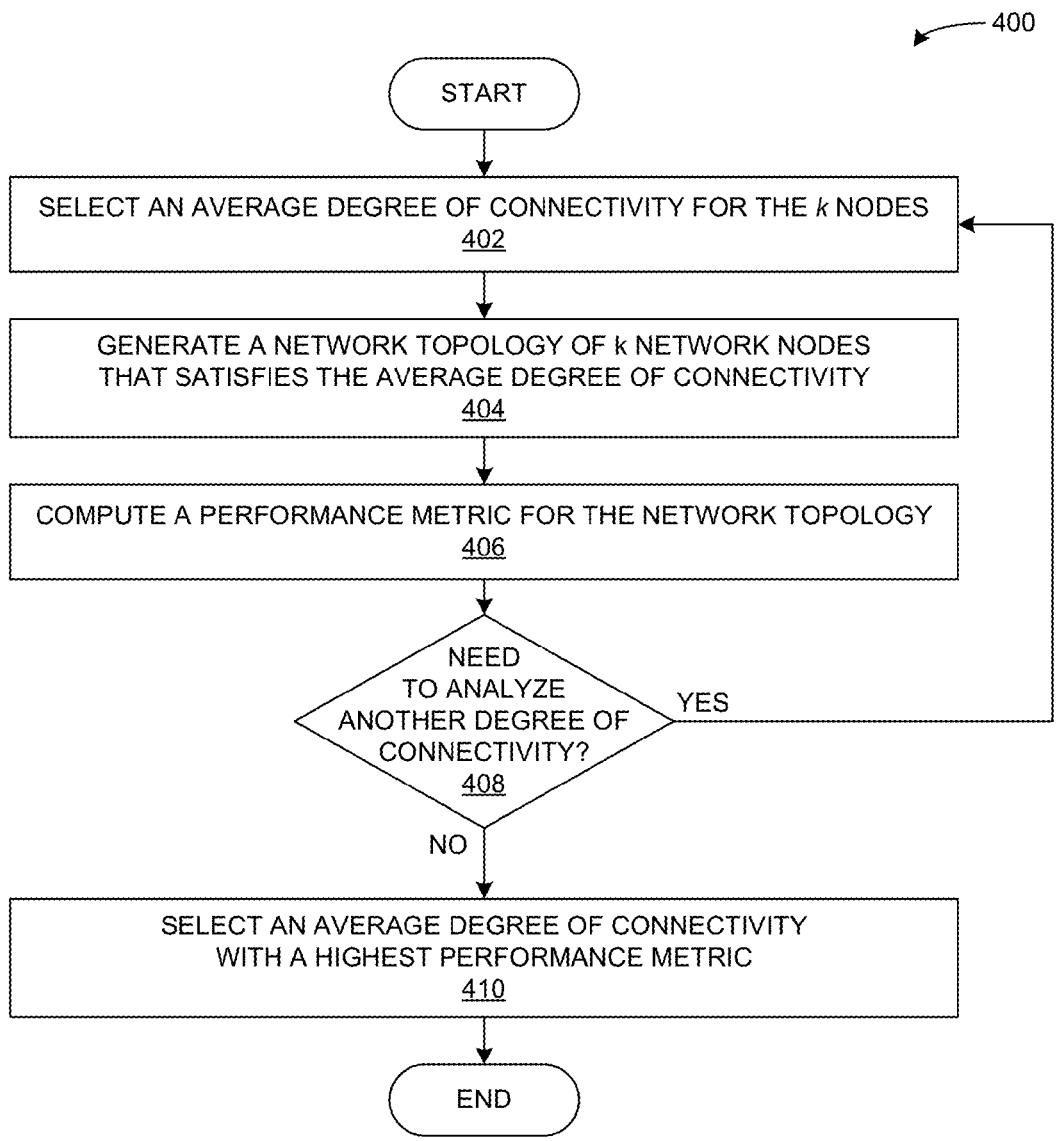
FIG. 4 presents a flow chart illustrating a method for determining an average degree of connectivity that optimizes a performance metric in accordance with an embodiment.

FIG. 4 presents a flow chart illustrating a method 400 for determining an average degree of connectivity that optimizes a performance metric in accordance with an embodiment. During operation, the system can analyze various average degrees of connectivity values to select a value with a highest performance metric. For example, the system can select an average degree of connectivity for the k nodes (operation 402), and generates a network topology of k nodes that satisfies the average degree of connectivity (operation 404). The system then computes a performance metric for the network topology (operation 406), and determines whether to analyze another degree of connectivity value (operation 408).

If the system has more average degree of connectivity values to analyze, the system can return to operation 402. Otherwise, the system can proceed to select an average degree of connectivity with a highest performance metric (operation 410).

Figure 5:
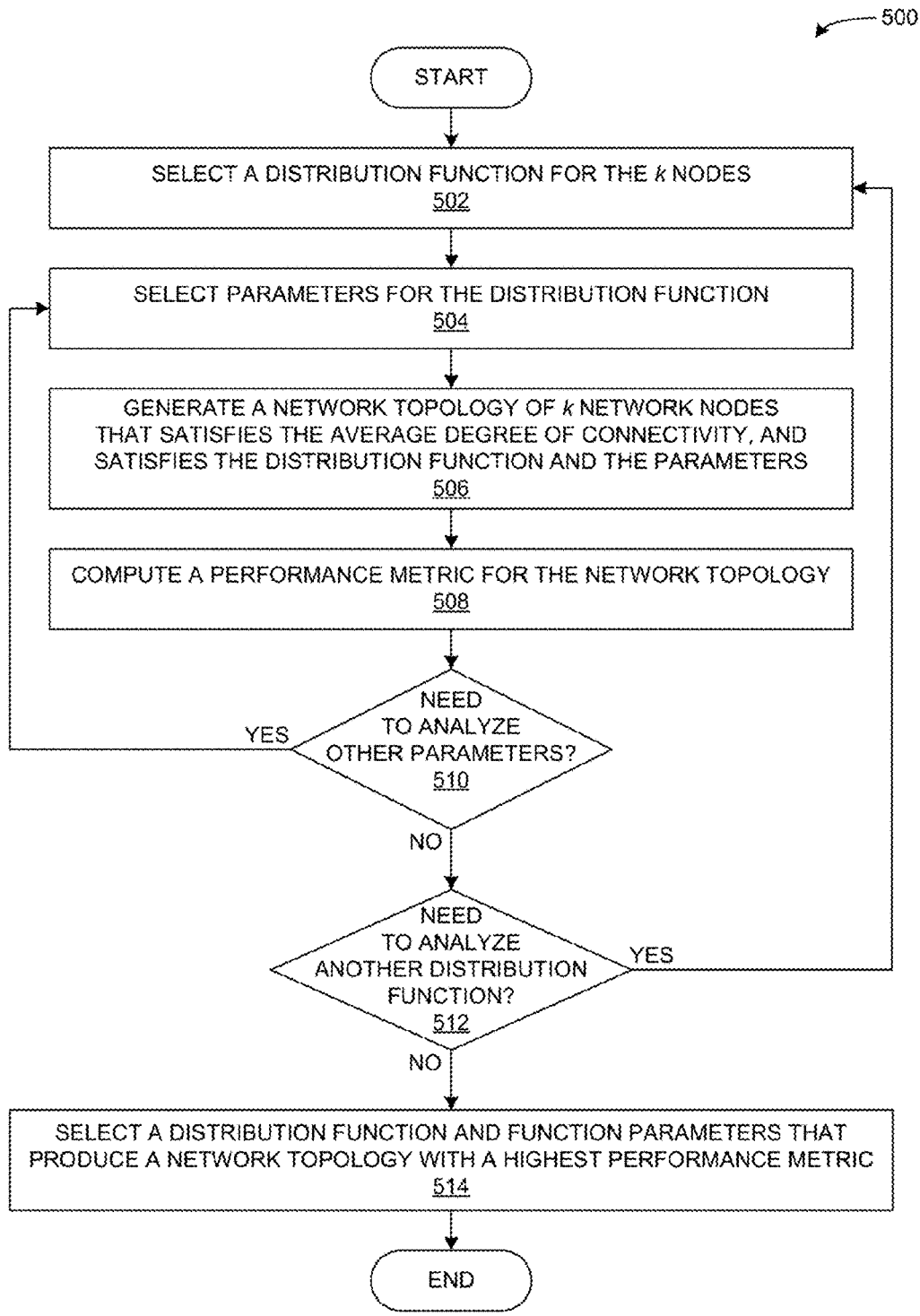
FIG. 5 presents a flow chart illustrating a method for determining a distribution function and function parameters that optimize a performance metric in accordance with an embodiment.

FIG. 5 presents a flow chart illustrating a method for determining a distribution function and function parameters that optimize a performance metric in accordance with an embodiment. During operation, the system can analyze various distribution functions and function parameters to select a value with a highest performance metric. For example, the system can select a distribution function for the k nodes (operation 502), and selects parameters for the distribution function (operation 504). In some embodiments, the distribution function can include a power-law distribution, a Gaussian distribution, or any other distribution function now known or later developed.

The system then generates a network topology of k network nodes (operation 506), and computes a performance metric for the network topology (operation 508). The system generates the network topology so that it satisfies the average degree of connectivity, and satisfies the distribution function and the parameters. Also, the system can store the performance metric in association with the average degree of connectivity, the distribution function, and the function parameters, such as in a flat file (e.g., a spreadsheet document) or in a database repository.

In some embodiments, the system can generate and test additional alternative network topologies for other function parameters, or for other distribution functions. For example, if the system needs to analyze other parameters for the same distribution function (operation 510), the system can return to operation 504 to select other parameters, and to compute a performance metric for these parameters. Otherwise, if the system needs to analyze a different distribution function (operation 512), the system can return to operation 502 to select another distribution function and function parameters for the k nodes, and to compute a performance metric for this other function and its parameters.

Once the system has computed performance metrics for various distribution functions and various alternative function parameters, the system can determine the highest computed performance metric, and can select a distribution function and function parameters that are stored in association with the highest performance metric (operation 514). The system can use this distribution function and function parameters to produce network topologies with a near-optimal performance metric.

Figure 6:
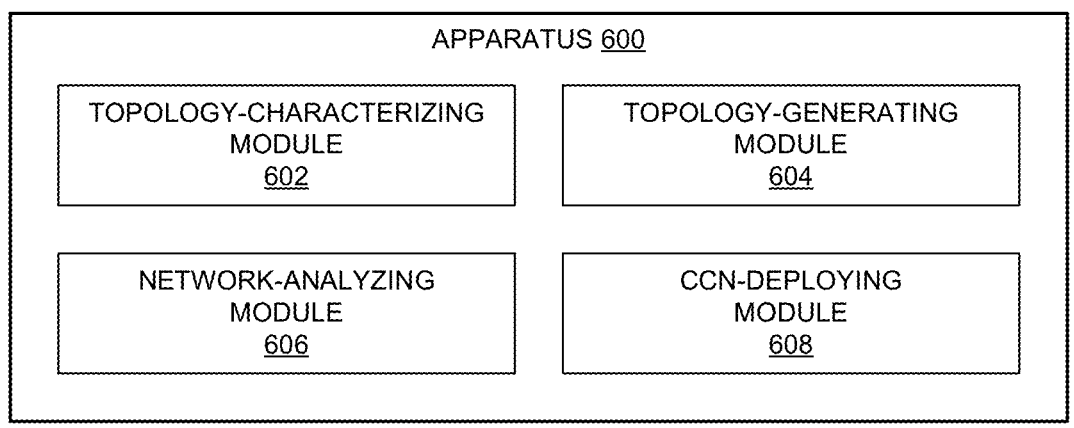
FIG. 6 illustrates an exemplary apparatus that facilitates deploying an overlay content centric network across an IP network in accordance with an embodiment.

FIG. 6 illustrates an exemplary apparatus 600 that facilitates deploying an overlay content centric network across an IP network in accordance with an embodiment. Apparatus 600 can comprise a plurality of modules which may communicate with one another via a wired or wireless communication channel. Apparatus 600 may be realized using one or more integrated circuits, and may include fewer or more modules than those shown in FIG. 6. Further, apparatus 600 may be integrated in a computer system, or realized as a separate device which is capable of communicating with other computer systems and/or devices. Specifically, apparatus 600 can comprise a topology-characterizing module 602, a topology-generating module 604, a network-analyzing module 606, and a CCN-deploying module 608.

In some embodiments, topology-characterizing module 602 can determine a number, k, of network nodes for a CCN network, and can determine at least an average degree of connectivity and a degree-of-connectivity distribution that achieves an optimal performance metric for the CCN network. Topology-generating module 604 can generate a network topology of k network nodes that satisfies the average degree of connectivity, and satisfies the degree-of-connectivity distribution. Network-analyzing module 606 can select k of network nodes of a computer network on which to overlay the CCN network, such that the selected nodes satisfy the generated network topology for the CCN network. Also, CCN-deploying module 608 can deploy the CCN network across the k nodes of the computer network.

Figure 7:
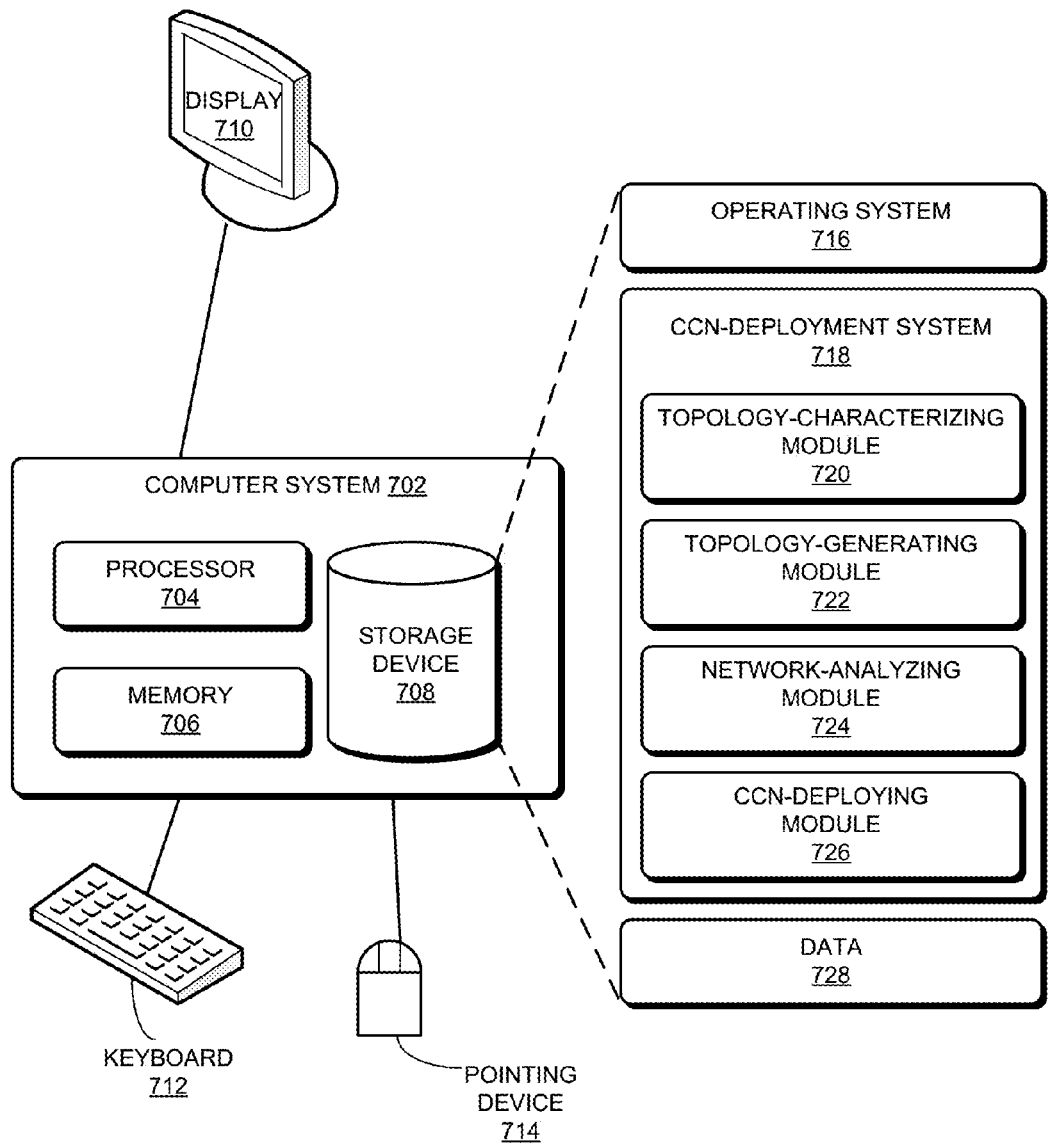
FIG. 7 illustrates an exemplary computer system that facilitates deploying an overlay content centric network across an IP network in accordance with an embodiment.

FIG. 7 illustrates an exemplary computer system 702 that facilitates deploying an overlay content centric network across an IP network in accordance with an embodiment. Computer system 702 includes a processor 704, a memory 706, and a storage device 708. Memory 706 can include a volatile memory (e.g., RAM) that serves as a managed memory, and can be used to store one or more memory pools. Furthermore, computer system 702 can be coupled to a display device 710, a keyboard 712, and a pointing device 714. Storage device 708 can store operating system 716, CCN-deployment system 718, and data 728.

CCN-deployment system 718 can include instructions, which when executed by computer system 702, can cause computer system 702 to perform methods and/or processes described in this disclosure. Specifically, CCN-deployment system 718 may include instructions for determining a number, k, of network nodes for a CCN network, and determining at least an average degree of connectivity and a degree-of-connectivity distribution that achieves an optimal performance metric for the CCN network (topology-characterizing module 720). Further, CCN-deployment system 718 can include instructions for generating a network topology of k network nodes that satisfies the average degree of connectivity, and satisfies the degree-of-connectivity distribution (topology-generating module 722).

CCN-deployment system 718 can include instructions for select k of network nodes of a computer network on which to overlay the CCN network, such that the selected nodes satisfy the generated network topology for the CCN network (network-analyzing module 724). CCN-deployment system 718 can also include instructions for deploying the CCN network across the k nodes of the computer network (CCN-deploying module 726).

Data 728 can include any data that is required as input or that is generated as output by the methods and/or processes described in this disclosure. Specifically, data 728 can store at least a network topology of an underlying physical network, a series of network topologies for various graph sizes k and for various average degrees of connectivity d, performance metrics for the various network topologies, and an optimized topology for a CCN network to deploy across the underlying physical network.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
   determining, by a computing device, a number k, of network nodes for a content centric networking (CCN) network;
   determining an average node degree as twice a number of edges divided by a number of nodes, a degree-ofconnectivity distribution, and a joint degree or higher-order distribution, that achieves an optimal performance metric for the CCN network to transmit a CCN Interest, wherein the joint degree distribution indicates an occurrence for a respective pair of node degrees, and wherein the higher-order distribution indicates a probability distribution of loops with at least three nodes;

generating a network topology of k network nodes that satisfies the average node degree, and satisfies the degree-of-connectivity distribution and joint degree or higher-order distribution;

mapping the k nodes of the generated network topology to nodes of a physical computer network; and transmitting the CCN Interest via the physical computer network according to the mapped network topology.

2. The method of claim 1, wherein mapping the k nodes of the generated network topology to nodes of the physical computer network involves selecting the k network nodes of the physical computer network on which to overlay the CCN network, such that the selected nodes satisfy the generated network topology for the CCN network; and wherein the method further comprises deploying the CCN network across the k nodes selected from the physical computer network.

3. The method of claim 1, wherein the performance metrics include at least one of:
CCN Interest overhead;
a number or percentage of CCN Interest retransmissions; and
an Interest-to-Content-Object round-trip delay.

4. The method of claim 1, wherein determining the average node degree involves:
iterating over one or more average node degrees, to generate a network topology of k network nodes for each average node degree;
computing a performance metric for each network topology; and
selecting an average node degree with a highest performance metric.

5. The method of claim 1, wherein determining the degree-of-connectivity distribution involves determining an optimal distribution based on one or more of:
a power-law distribution; and
a Gaussian distribution.

6. The method of claim 1, wherein determining the degree-of-connectivity distribution involves:
iterating over one or more distribution functions, to generate a network topology of k network nodes that satisfies the average node degree based on a corresponding distribution function;
computing a performance metric for each network topology; and
selecting a degree-of-connectivity distribution with a highest performance metric.

7. The method of claim 6, wherein determining the degree-of-connectivity distribution further involves:
iterating over one or more parameters for the distribution function, to generate a network topology of the k network nodes that satisfies the average node degree based on each distribution function;
computing a performance metric for each network topology; and
selecting network parameters with a highest performance metric.

8. The method of claim 1, wherein the joint degree or higher-order distribution includes a degree-distribution matrix.

9. The method of claim 8, wherein determining the degree-of-connectivity distribution involves:
generating the degree-distribution matrix to indicate the occurrence value for each pair of node degrees, wherein the degree-distribution matrix is multi-dimensional, and achieves an optimal performance metric for a network topology of the k network nodes that satisfies the average node degree.

10. A non-transitory computer-readable storage medium storing instructions that when executed by a computer cause the computer to perform a method:
determining a number k, of network nodes for a content centric networking (CCN) network;
determining an average node degree as twice a number of edges divided by a number of nodes, a degree-of-connectivity distribution, and a joint degree or higher-order distribution, that achieves an optimal performance metric for the CCN network to transmit a CCN Interest, wherein the joint degree distribution indicates an occurrence for a respective pair of node degrees, and wherein the higher-order distribution indicates a probability distribution of loops with at least three nodes;
generating a network topology of k network nodes that satisfies the average node degree, and satisfies the degree-of-connectivity distribution and joint degree or higher-order distribution;
mapping the k nodes of the generated network topology to nodes of a physical computer network; and
transmitting the CCN Interest via the physical computer network according to the mapped network topology.

11. The non-transitory computer-readable storage medium of claim 10, wherein mapping the k nodes of the generated network topology to nodes of the physical computer network involves selecting the k network nodes of the physical computer network on which to overlay the CCN network, such that the selected nodes satisfy the generated network topology for the CCN network; and wherein the method further comprises deploying the CCN network across the k nodes selected from the physical computer network.

12. The non-transitory computer-readable storage medium of claim 10, wherein determining the average node degree involves:
iterating over one or more average node degrees, to generate a network topology of k network nodes for each average node degree;
computing a performance metric for each network topology; and
selecting an average node degree with a highest performance metric.

13. The non-transitory computer-readable storage medium claim 10, wherein determining the degree-of-connectivity distribution involves determining an optimal distribution based on one or more of:
a power-law distribution; and
a Gaussian distribution.

14. The non-transitory computer-readable storage medium of claim 10, wherein determining the degree-of-connectivity distribution involves:
iterating over one or more distribution functions, to generate a network topology of k network nodes that satisfies the average node degree based on a corresponding distribution function;
computing a performance metric for each network topology; and
selecting a degree-of-connectivity distribution with a highest performance metric.

15. The non-transitory computer-readable storage medium of claim 14, wherein determining the degree-of-connectivity distribution further involves:
  iterating over one or more parameters for the distribution function, to generate a network topology of the k network nodes that satisfies the average node degree based on each distribution function;
  computing a performance metric for each network topology; and
  selecting network parameters with a highest performance metric.

16. The non-transitory computer-readable storage medium of claim 10, wherein the joint degree or higher-order distribution includes a degree-distribution matrix.

17. The non-transitory computer-readable storage medium of claim 16, wherein determining the degree-of-connectivity distribution involves:
  generating the degree-distribution matrix to indicate the occurrence value for each pair of node degrees, wherein the degree-distribution matrix is multi-dimensional, and achieves an optimal performance metric for a network topology of the k network nodes that satisfies the average node degree.

18. An apparatus, comprising:
  a processor; and
  storage medium storing instructions that when executed by the processor cause the apparatus to perform a method, the method comprising:
  determining a number k, of network nodes for a content centric networking (CCN) network;
  determining an average node degree as twice a number of edges divided by a number of nodes, a degree-of-connectivity distribution, and a joint degree or higher-order distribution, that achieves an optimal performance metric for the CCN network to transmit a CCN Interest, wherein the joint degree distribution indicates an occurrence for a respective pair of node degrees, and wherein the higher-order distribution indicates a probability distribution of loops with at least three nodes;
  generating a network topology of k network nodes that satisfies the average node degree, and satisfies the degree-of-connectivity distribution and joint degree or higher-order distribution;
  mapping the k nodes of the generated network topology to nodes of a physical computer network; and
  transmitting the CCN Interest via the physical computer network according to the mapped network topology.

19. The apparatus of claim 18, wherein mapping the k nodes of the generated network topology to nodes of the physical computer network involves selecting k network nodes of the physical computer network on which to overlay the CCN network, such that the selected nodes satisfy the generated network topology for the CCN network; and
  wherein the method further comprises deploying the CCN network across the k nodes selected from the physical computer network.

20. The apparatus of claim 18, wherein determining the average node degree involves:
  iterating over one or more average node degrees, to generate a network topology of k network nodes for each average node degree;
  computing a performance metric for each network topology; and
  selecting an average node degree with a highest performance metric.

21. The apparatus of claim 18, wherein determining the degree-of-connectivity distribution involves:
  iterating over one or more distribution functions, to generate a network topology of k network nodes that satisfies the average node degree based on a corresponding distribution function;
  computing a performance metric for each network topology; and
  selecting a degree-of-connectivity distribution with a highest performance metric.

22. The apparatus of claim 21, wherein determining the degree-of-connectivity distribution further involves:
  iterating over one or more parameters for the distribution function, to generate a network topology of the k network nodes that satisfies the average node degree based on each distribution function;
  computing a performance metric for each network topology; and
  selecting network parameters with a highest performance metric.

23. The apparatus of claim 18, wherein the joint degree or higher-order distribution includes a degree-distribution matrix.

24. The apparatus of claim 23, wherein determining the degree-of-connectivity distribution involves:
  generating the optimal degree-distribution matrix to indicate the occurrence value for each pair of node degrees, wherein the degree-distribution matrix is multi-dimensional, and achieves an optimal performance metric for a network topology of the k network nodes that satisfies the average node degree.

* * * * *